United States Patent
Yang et al.

(10) Patent No.: US 11,842,165 B2
(45) Date of Patent: Dec. 12, 2023

(54) CONTEXT-BASED IMAGE TAG TRANSLATION

(71) Applicant: Adobe Inc., San Jose, CA (US)

(72) Inventors: Yang Yang, San Jose, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 896 days.

(21) Appl. No.: 16/553,305

(22) Filed: Aug. 28, 2019

(65) Prior Publication Data

US 2021/0064704 A1 Mar. 4, 2021

(51) Int. Cl.
*G06F 16/53* (2019.01)
*G06F 40/58* (2020.01)
*G06F 16/58* (2019.01)

(52) U.S. Cl.
CPC .............. *G06F 40/58* (2020.01); *G06F 16/53* (2019.01); *G06F 16/5866* (2019.01)

(58) Field of Classification Search
CPC ...... G06F 16/53; G06F 16/50; G06F 16/5866; G06F 16/587; G06F 16/58
See application file for complete search history.

(56) References Cited

U.S. PATENT DOCUMENTS

| | | | | |
|---|---|---|---|---|
| 10,242,034 B1* | 3/2019 | Li | ................. | G06F 16/4393 |
| 2002/0175937 A1* | 11/2002 | Blakely | ................. | G06F 9/454 |
| | | | | 715/744 |
| 2004/0098247 A1* | 5/2004 | Moore | ................. | G06F 40/44 |
| | | | | 704/4 |
| 2005/0198573 A1* | 9/2005 | Ali | ................. | G06F 40/45 |
| | | | | 715/264 |
| 2006/0294463 A1* | 12/2006 | Chu | ................. | G06F 9/454 |
| | | | | 715/703 |
| 2007/0179775 A1* | 8/2007 | Bauman | ................. | G06F 9/454 |
| | | | | 704/8 |
| 2007/0244691 A1* | 10/2007 | Alwan | ................. | G06F 40/169 |
| | | | | 704/8 |
| 2008/0262828 A1* | 10/2008 | Och | ................. | G06F 40/47 |
| | | | | 704/3 |

(Continued)

OTHER PUBLICATIONS

"An Automatic Translation of Tags for Multimedia Contents Using Folksonomy Networks", Jul. 19-23, 2009, URL=https://doi.org/10.1145/1571941.1572026, download date Jun. 8, 2020 (Year 2009) (Year: 2009) (Year: 2009).*

(Continued)

*Primary Examiner* — Vaishali Shah
(74) *Attorney, Agent, or Firm* — Kilpatrick Townsend & Stockton LLP

(57) ABSTRACT

In some embodiments, a context-based translation application generates a co-occurrence data structure for a target language describing co-occurrences of target language words and source language words. The context-based translation application receives an input tag for an input image in the source language to be translated into the target language. The context-based translation application obtains multiple candidate translations in the target language for the input tag and determines a translated tag from the multiple candidate translations based on the co-occurrence data structure. The context-based translation application further associates the translated tag with the input image.

16 Claims, 9 Drawing Sheets
(2 of 9 Drawing Sheet(s) Filed in Color)

(56) References Cited

U.S. PATENT DOCUMENTS

| | | | |
|---|---|---|---|
| 2008/0267504 A1* | 10/2008 | Schloter | G06F 16/9554 382/181 |
| 2009/0210214 A1* | 8/2009 | Qian | G06F 16/3337 704/2 |
| 2009/0326911 A1* | 12/2009 | Menezes | G06F 40/55 704/2 |
| 2012/0099784 A1* | 4/2012 | Marchesotti | G06F 16/5838 382/162 |
| 2012/0284015 A1* | 11/2012 | Drewes | G06F 40/51 704/3 |
| 2015/0278747 A1* | 10/2015 | Karanam | G06Q 10/063112 705/7.14 |
| 2016/0259760 A1* | 9/2016 | Gusakov | G06V 30/40 |
| 2017/0262433 A1* | 9/2017 | Chester | G06N 3/0454 |
| 2018/0075508 A1* | 3/2018 | Hewavitharana | G06Q 30/0601 |
| 2018/0129972 A1* | 5/2018 | Chen | G06N 3/0454 |
| 2019/0325308 A1* | 10/2019 | Chung | G06N 3/08 |
| 2020/0210471 A1* | 7/2020 | Hsiao | G06F 16/583 |

OTHER PUBLICATIONS

Github, Inc., "Facebookresearch/FastText", https://github.com/facebookresearch/fastText#full-documentation, 2019, accessed Aug. 28, 2019, 7 pages.

Conneau, Alexis, et al., "Word Translation Without Parallel Data", Computer Science, arXiv:1710.04087v3, Jan. 2018, 14 pages.

Sutskever, Ilya, et al., "Sequence to Sequence Learning with Neural Networks", Advances in Neural Information Processing Systems, Sep. 2014, 9 pages.

Facebook Open Source, Facebook, Inc. "Get Started Fast Text", https://fasttext.cc/docs/en/support.html, 2019, accessed Aug. 28, 2019, 3 pages.

* cited by examiner

CO-OCCURRENCE MATRIX 118

|  | $W_{T1}$ | $W_{T2}$ | ... | $W_{Tk}$ | ... |
|---|---|---|---|---|---|
| $W_{S1}$ | $C_{11}$ | $C_{12}$ | ... | $C_{1k}$ | ... |
| $W_{S2}$ | $C_{21}$ | $C_{22}$ | ... | $C_{2k}$ | ... |
| ... | ... | ... | ... | ... | ... |
| $W_{Sl}$ | $C_{l1}$ | $C_{l2}$ | ... | $C_{lk}$ | ... |
| ... | ... | ... | ... | ... | ... |

$W_T$ = Word in Target Language
$W_S$ = Word in Source Language
$C_{ij}$ = # of images in relevant images of $W_{Tj}$ that have $W_{Ti}$ as a word in the tag

402

|  | ... | ... | VIEUX | DINDE | TURQUIE | ... |
|---|---|---|---|---|---|---|
| ... | 2 | ... | ... | ... | ... | ... |
| ... | 5 | ... | ... | ... | ... | ... |
| OLD | 0 | ... | 5 | 0 | 0 | ... |
| AGED | 0 | ... | 3 | 0 | 0 | ... |
| ANCIENT | 0 | ... | 2 | 0 | 0 | ... |
| ... |  | ... |  |  |  | ... |
| TURKEY | 0 | ... | 0 | 10 | 12 | ... |
| ... |  | ... |  |  |  | ... |

FIGURE 4

CONTEXT-BASED IMAGE TAG TRANSLATION

TECHNICAL FIELD

This disclosure relates generally to computer-implemented methods and systems for image related data processing. Specifically, the present disclosure involves translation image tags based on a context of a tagged image.

BACKGROUND

Automatic image tagging generates tags for images based on content or other attributes of the images. The generated tags can be useful in various applications. For example, these image tags can be used for image searching where users can search their personal images in apps or mobile devices by matching search keywords with image tags.

SUMMARY

Certain embodiments involve context-based image tag translation. In one example, a processing device generates a co-occurrence data structure for a target language based on relevant images that are related to a set of target language words. The co-occurrence data structure describes a co-occurrence of a target language word from the set of target language words and a source language word associated with the relevant images. The processing device receives an input tag for an input image in a source language and generates a set of candidate translations in the target language for the input tag. The processing device selects a translated tag from the set of candidate translations based on the co-occurrence data structure indicating a higher relevance for the translated tag than a different translated tag from the set of candidate translations. The processing device associates the translated tag with the input image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Features, embodiments, and advantages of the present disclosure are better understood when the following Detailed Description is read with reference to the accompanying drawings.

FIG. 4 depicts an example of the co-occurrence matrix structure and an example of a co-occurrence matrix for the French language, according to certain aspects of the present disclosure.

DETAILED DESCRIPTION

Figure 1:
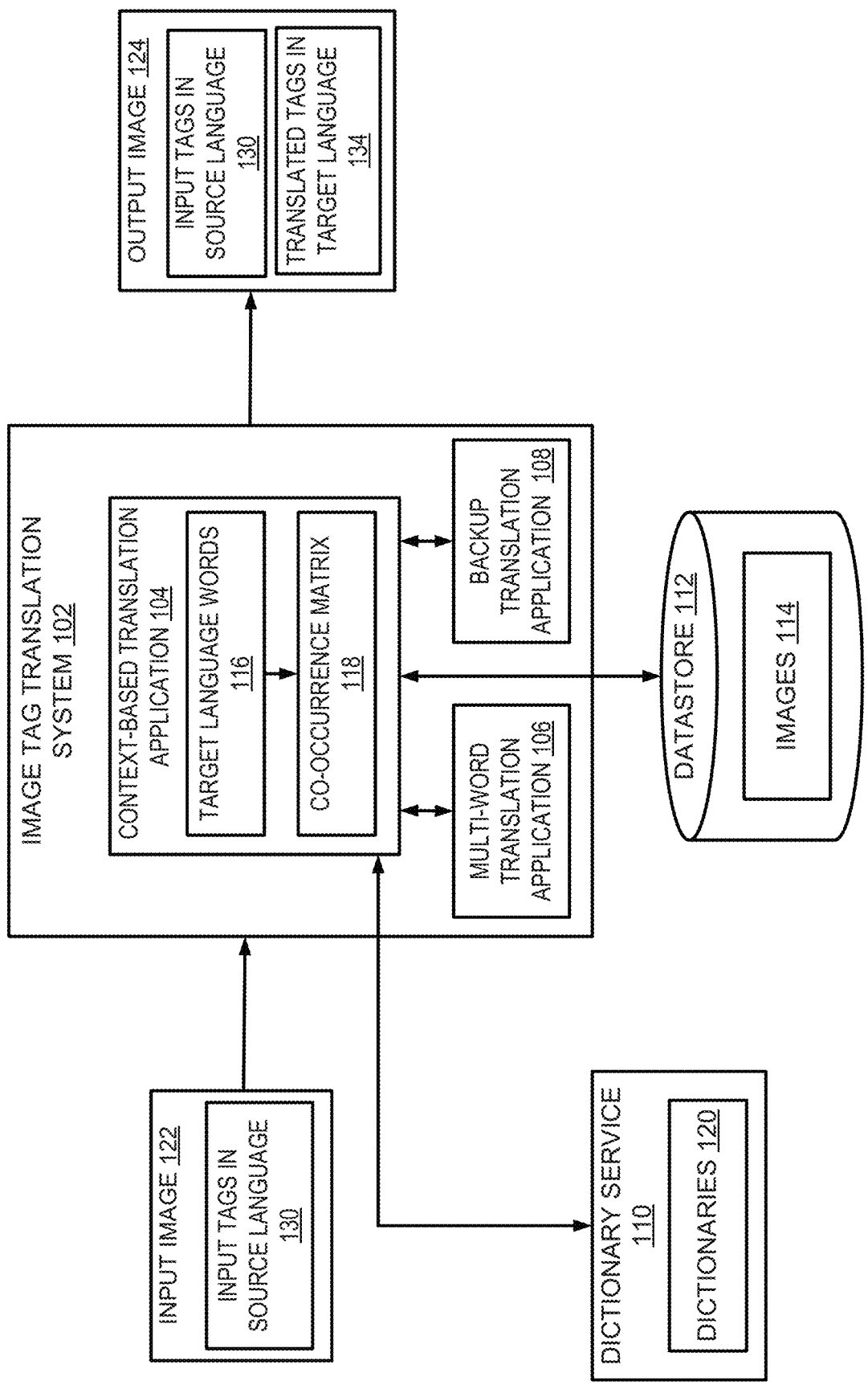
FIG. 1 depicts an example of a computing environment for using context-based image tag translation to generate translated tags for an image, according to certain aspects of the present disclosure.

The present disclosure involves context-based image tag translation for translating the content of image tags between source and target languages (e.g., English, Japanese, French, etc.). Recently, most auto-tagging systems are trained in English and only generate English tags. To allow non-English speaking users to take advantage of the generated image tags, these tags need to be provided in multiple language options. Existing approaches used for image tag translation rely on a dictionary for translating words in an English image tag into words in a different language without considering the context of the image. For an input word, these existing approaches often return multiple translation candidates that can have very different meanings especially if the input English word is a polysemy. For example, an image of a Thanksgiving celebration may have an English tag "turkey." This tag would be more accurately translated into "dinde" (the food) in French, rather than "turquie" (the country). By returning both translation candidates, these existing approaches are insufficient to provide accurate translation for image tags.

Certain embodiments described herein address the limitations of the existing approaches by accounting for the context of an image, such as the topic covered by the image, location of the subject of the image, or other keywords associated with the image, to translate an input tag from a source language to a target language. For instance, if an input image includes an input tag to be translated along with other tags, a context-based translation application utilizes the other tags of the input image as the context of the image. These other tags are also referred to herein as "context tags." The context-based translation application further obtains multiple candidate translations of the input tag, such as through a dictionary service. The context-based translation application evaluates the relevance of each candidate translation, where candidate translation with a stronger relationship to the context tags could be determined to be more relevant. A candidate translation with a strong relationship to the context tags is more likely to be the accurate translation of the input tag and is thus selected as the translated tag.

The following non-limiting example is provided to introduce certain embodiments. In this example, a context-based translation application generates a co-occurrence matrix for the target language based on relevant images, such as images that are related to target language words. For example, the relevant images of a target language word can include images with target language tags that contain the target language word, images returned in the search results in response to a query that includes the target language word, or both. The co-occurrence matrix describes the co-occurrence of a target language word and a source language word in these relevant images. In this example, the context-based translation application builds the co-occurrence matrix, where rows represent words in source languages and columns represent words in a target language, based on images having tags in both the source language and the target language. For instance, a co-occurrence value, which is located at a row representing a source language word and a column representing a source language word, identifies the number of relevant images for the target language word that contain the source language word in their tags. A higher co-occurrence value indicates a closer relationship between the target language word and the source language word.

Continuing with this example, the context-based translation application receives input tags of an image for translation, and uses the co-occurrence matrix to facilitate the translation. For instance, the context-based translation application obtains multiple candidate translations of an input tag (e.g., from a dictionary service). For example, for an input English tag "turkey," the candidate translations in French include "dinde" (the food) and "turquie" (the country). The context-based translation application evaluates the relevance of these candidate translations based on the context tags of the image to determine the translated tag.

To do so, the context-based translation application accesses the co-occurrence matrix and calculates a context score for each of the candidate translations. The co-occurrence matrix provides a quantitative measurement of the relevance between each context tag (a source language word) and the candidate translation (a target language word, such as "dinde" or "turquie"). The context-based translation application calculates a context score for each of the candidate translations by aggregating the co-occurrence of the context tags and the candidate translation. The candidate translation having the highest context score is selected as the translated tag for the input tag. In the above example where an input image has an input tag "turkey," if the context tags of the image include "Thanksgiving," "holiday," "family," "food," the co-occurrence of each of these context tags with the candidate translation "dinde" (the food) would be higher than "turquie" (the country) according to the co-occurrence matrix. As a result, the candidate translation "dinde" will have a higher context score than the candidate translation "turquie" and will thus be selected as the translated tag for the input tag "turkey" of the input image.

As described herein, certain embodiments provide improvements in image data processing by generating accurate image tag translation. Existing approaches on image tag translation rely on dictionaries to translate words in an English image tag into words in a different language without considering the context of the image. As a result, these existing approaches are unable to provide an accurate image tag translation especially when an image tag has multiple candidate translations. Certain embodiments presented herein account for the context of an image to perform the image tag translation and select the candidate translation that co-occurs with the context image as the translated image tag. The translated tag generated in this way is thus consistent with the context of the image thereby more accurately reflect the meaning of the input image tag.

For example, particular rules and data structures are established to enable the automation of image tag translation tasks that previously could only be performed subjectively by humans. These particular rules include, among others, evaluating the relevance of a candidate translation with the context of the image through a data structure of a co-occurrence matrix. The context is described using the image tags other than the tag being translated. In addition, these particular rules further include building the co-occurrence matrix based on images containing both source language tags and target language tags. As a result, the co-occurrence matrix is applicable to image tag translation and more accurately captures the relationship between source language words and target language words contained in image tags, leading to a more accurate image tag translation. With the translated image tags, other technical improvements can also be achieved, such as more efficient and accurate image searching, archiving, classification, and so on.

Example Operating Environment for Context-based Image Tag Translation

Referring now to the drawings, FIG. 1 depicts an example of a computing environment 100 for using context-based image tag translation to generate translated tags for an input image 122. The computing environment 100 includes an image tag translation system 102, which can include one or more processing devices that execute a context-based translation application 104 to perform context-based image tag translation. The one or more processing devices of the image tag translation system 102 further execute a multi-word translation application 106 for translating multi-word tags in the input image 122 and a backup translation application 108 for translating image tags that cannot be translated by other applications of the image tag translation system 102. The computing environment 100 further includes a dictionary service 110 for providing translations to the words contained in the tags of the image 122. The dictionary service 110 may be in communication with the image tag translation system 102 directly or through a network (not shown in FIG. 1). The computing environment 100 also includes a datastore 112 for storing various images 114 that have image tags in both source language and target language.

The image tag translation system 102 receives the input tags 130 of the input image 122. The input tags 130 are in a source language, such as English, and are to be translated to a target language, such as French. The image tag translation system 102 also receives an indication of the target language. For each of the input tags 130, the image tag translation system 102 generates a translated tag 134 in the target language. These translated tags 134 can be attached to the input image 122, for example, by adding to the metadata of the input image 122 to generate an output image 124.

In some examples, the image tag translation system 102 determines, for an input tag 130 to be translated, whether the input tag 130 is a multi-word tag that contains multiple words in the source language. If the input tag 130 is a multi-word tag, the image tag translation system 102 employs the multi-word translation application 106 to perform the translation. In some implementations, the multi-word translation application 106 includes a machine-learning model that can translate a multi-word tag from the source language to the target language.

For example, the machine-learning model can include a Long Short-Term Memory (LSTM) model or multiple LSTM models to perform the translation of multi-word image tags. The multi-word translation application 106 can also use existing models trained to perform translations of sentences from the source language to the target language. Alternatively, or additionally, the multi-word translation application 106 can train a machine-learning model for translating image tags rather than full sentences and utilizes the training model for multi-word tag translation. If the input tag 130 is to be translated into multiple target languages, multiple machine-learning models can be built, one for each target language, and used to perform the translation.

If the image tag translation system 102 determines that the input tag 130 is not a multi-word tag, but rather a single-word tag, the image tag translation system 102 communicates with the dictionary service 110 to obtain candidate translations of the word in the input tag 130. To provide the translation service, the dictionary service 110 can include multiple dictionaries 120, one for each target language, for translating a word in a source language into multiple target languages. For example, the image tag translation system 102 sends the single-word tag to the dictionary service 110 to obtain translations of the single-word tag in the target language.

In some cases, especially if the single word in the input tag 130 is a polysemy, the dictionary service 110 may return multiple candidate translations for the input tag 130. The image tag translation system 102 receives these multiple candidate translations and employs the context-based translation application 104 to determine which of the candidate translations can be used as the translated tag 134 for the input image 122. To achieve an accurate translation, the context-based translation application 104 takes into account the context of the input image 122, and thus the context of the input tag 130, to determine the translated tag 134 for the input tag 130. The context of the input image 122 can be determined, for example, by analyzing the content of the input image 122. In other examples, the context-based translation application 104 can determine the context of the input image 122 by examining the input tags 130 of the input image 122. Those input tags 130 of the input image 122 other than the current input tag 130 to be translated can thus be utilized to determine the proper candidate translation for the input tag 130.

To utilize the context of the input image 122, in some implementations, the context-based translation application 104 builds a co-occurrence matrix 118 describing the relationship between source language words and target language words 116. A co-occurrence matrix 118 can be built for each target language. The target language words 116 to be included in the co-occurrence matrix 118 can include the target language words contained in the dictionary 120 used by the dictionary service 110 or target language words obtained from other sources. The source language words included in the co-occurrence matrix 118 can contain the words observed in the tags of images 114 stored in the data store 112. Details regarding establishing and utilizing the co-occurrence matrix 118 to determine the translated tag 134 are provided below with regard to FIGS. 2-5.

In some scenarios, such as the word contained in the input tag 130 is a rare word not covered by the dictionary 120, the dictionary service 110 might return no candidate translation for the single-word tag. In this case, the image tag translation system 102 employs the backup translation application 108 to perform the translation and generate the translated tag 134. In some implementations, the backup translation application 108 is implemented as a comprehensive translation service but with lower accuracy than the dictionary service 110. For example, the backup translation application 108 can be implemented using an existing model trained for translating words or sentences from a source language to a destination language. Alternatively, the backup translation application 108 can be implemented by aligning word embeddings that have been generated for different source language words and target language words. For example, to translate a word in English to French, the English embedding of the input English word can be used to find the most correlated words in French embeddings and produce those highly correlated French words as the translation of the word. Other ways of implementing the backup translation application 108 can also be utilized.

The image tag translation system 102 outputs the determined translation for the input tag 130 as the corresponding translated tag 134. The above process can be repeated for each of the input tags 130 of the input image 122 to generate the translated tags 134. The image tag translation system 102 or another system attaches these translated tags 134 to the input image 122 to generate the output image 124. If the input tags 130 need to be translated into another target language, the image tag translation system 102 performs a similar process as described above by using proper components, models and words for this specific target language, including, for example, the dictionary 120, the co-occurrence matrix 118, the machine-learning models in the multi-word translation application 106, the word embeddings in the backup translation application 108, and so on. Additional details regarding generating a translated tag 134 for an input tag 130 of an input image 122 are described herein with respect to FIGS. 6-8.

Although FIG. 1 illustrates that the multi-word translation application 106 and the backup translation application 108 are included in the image tag translation system 102. Either of the two applications may be implemented by a separate system in communication with the image tag translation system 102. Similarly, although FIG. 1 illustrates that the dictionary service 110 is implemented as a separate service or application from the image tag translation system 102, it can be implemented as one application of the image tag translation system 102. Further, while FIG. 1 shows that an input image 122 is provided to the image tag translation system 102, the image tag translation system 102 can perform the image tag translation without receiving, obtaining or otherwise accessing the input image 122. Likewise, the image tag translation system 102 also may not generate the output image 124. Associating the translated tags 134 with the input image 122 to generate the output image 124 may be performed by a computing device or system different from image tag translation system 102.

Figure 2:
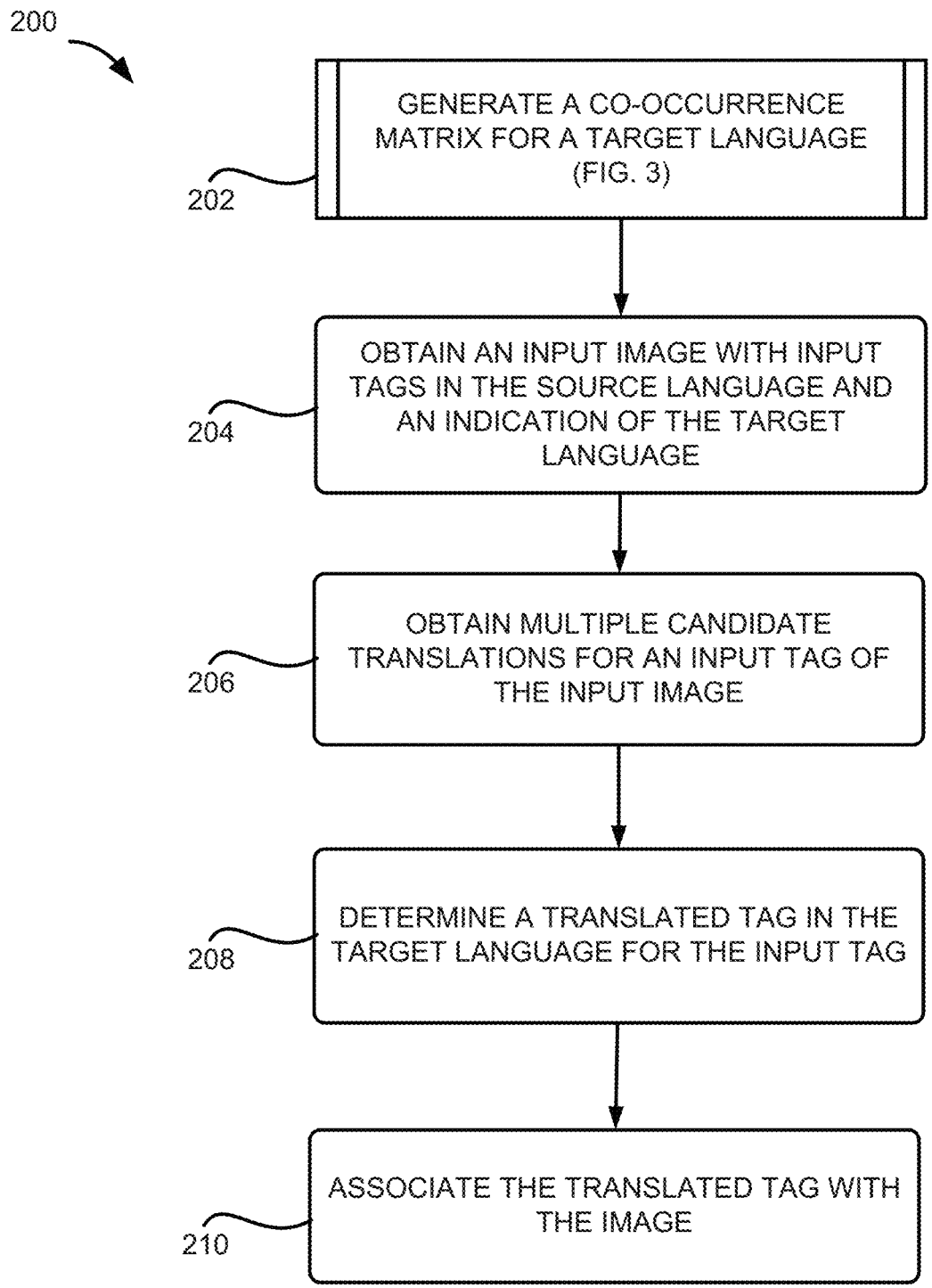
FIG. 2 depicts an example of a process for selecting a translated tag from multiple candidate translations based on the context of the image, according to certain aspects of the present disclosure.
Figure 3:
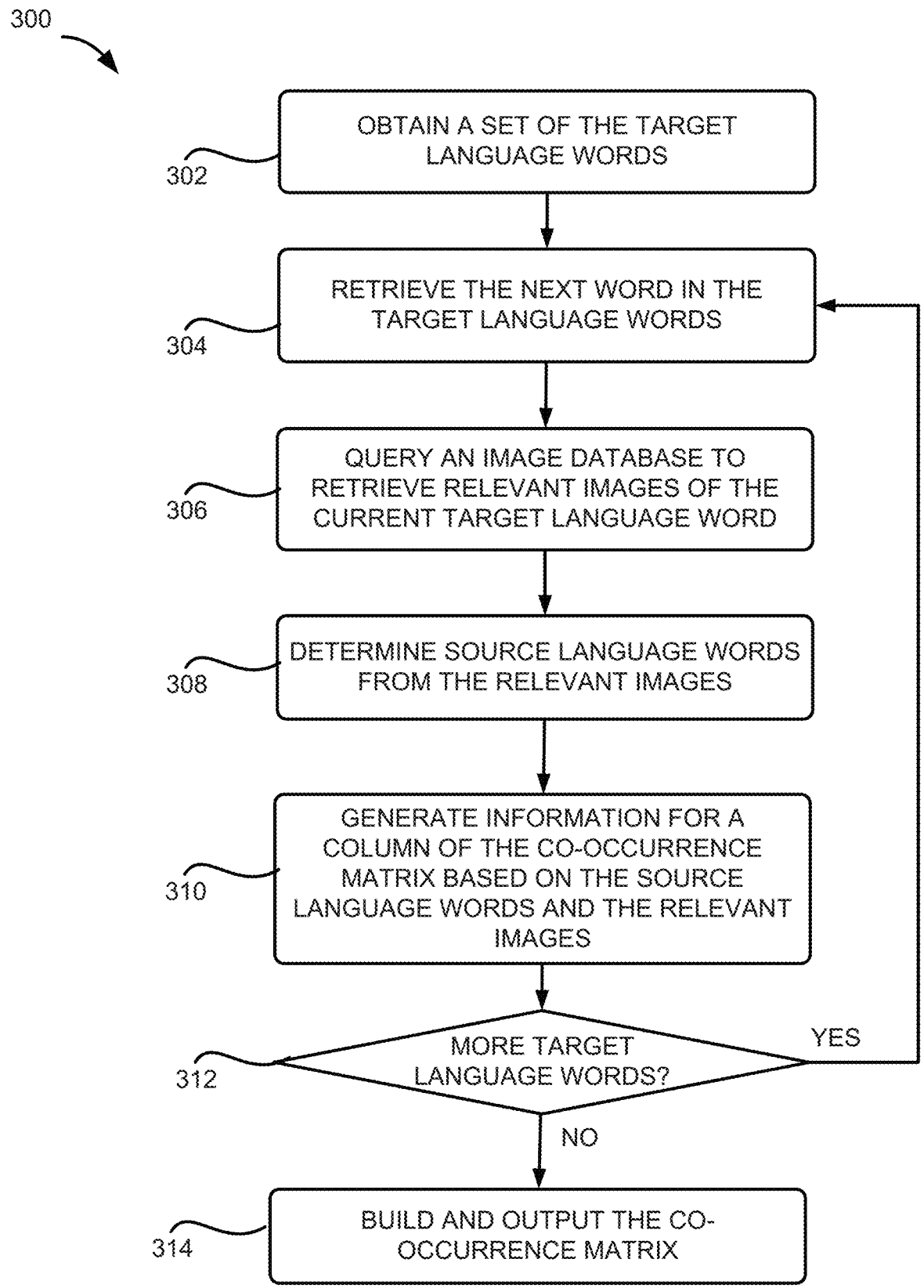
FIG. 3 depicts an example of a process for generating a co-occurrence matrix for a target language, according to certain aspects of the present disclosure.
Figure 5:
FIG. 5 depicts an example of an image with tags in English and translated tags in French, according to certain aspects of the present disclosure.

FIG. 2 depicts an example of a process 200 for selecting a translated tag for an input image 122 from multiple candidate translations of the input tag of the input image 122 based on the context of the input image 122, according to certain aspects of the present disclosure. FIG. 2 is described in conjunction with FIGS. 3-5. FIG. 3 depicts an example of a process for generating a co-occurrence matrix for a target language. FIG. 4 depicts an example of the co-occurrence matrix structure and an example of a co-occurrence matrix for the French language. FIG. 5 depicts an example of an image with tags in English and translated tags in French. One or more computing devices (e.g., the image tag translation system 102) implement operations depicted in FIG. 2 by executing suitable program code (e.g., the context-based translation application 104). For illustrative purposes, the process 200 is described with reference to certain examples depicted in the figures. Other implementations, however, are possible.

At block 202, the process 200 involves generating a co-occurrence matrix 118 for a target language. The co-occurrence matrix 118 describes the co-occurrence of source language words and target language words 116. FIG. 3 depicts an example of a process 300 for generating a co-occurrence matrix for a target language. At block 302, the process 300 involves obtaining a set of the target language words 116. In some examples, the context-based translation application 104 obtains the set of the target language words 116 from the dictionary 120 of the dictionary service 110. For instance, the context-based translation application 104 can use a subset of or the entire target language words in the dictionary 120 to build the co-occurrence matrix 118.

At block 304, the process 300 involves retrieving the next word in the target language words 116 as the current target language word to be evaluated. At block 306, the process 300 involves querying an image database to retrieve relevant images that are related to the current target language word. In one example, the image database can include the images 114 contained in the datastore 112. As described above, the images 114 contained in the datastore 112 have tags in both the source language and the target language. The query can thus be performed by retrieving images having tags containing or otherwise matching the current target language word. For instance, if the target language is French and the current target language word is the French word "vieux," those images 114 that have the word "vieux" in their tags are the relevant images and are retrieved.

At block 306, the process 300 involves determining tags of the relevant images in the source language. The context-based translation application 104 collects the source language tags of the relevant images and identifies the source language words contained in these source language tags. Continuing with the above example, if an image has four English (source language) tags: "old," "temple," "white roof," "building," and four corresponding French (target language) tags: "vieux," "temple," "toit blanc" and "bâtiment," the image is determined to be a relevant image, at least because it contains the current target language word "vieux." The context-based translation application 104 further identifies the source language tags of this relevant image and collects the source language words in these source language tags as "old," "temple," "white," "roof," and "building." This process can be repeated for each of the relevant images. In some embodiments, the number of relevant images used for analysis is limited by an upper limit M, such as 100 images. In other words, up to M relevant images of the current target language word are used to determine the source language words and generate the co-occurrence matrix 118.

At block 310, the process 300 involves generating information for a column of the co-occurrence matrix 118 based on the source language words and the relevant images. As will be discussed later with regard to block 314, the generated information will be used to fill in the column of the co-occurrence matrix 118. This column of the co-occurrence matrix 118 corresponds to the current target language word. The information generated for a column of the co-occurrence matrix 118 can include the source language words identified from the relevant images of the current target language word and the co-occurrence between respective source language word and the current target language word.

In one example, the co-occurrence is determined as the number of relevant images of the current target language word that have the corresponding source language word appearing in their respective tags. The co-occurrence can also be determined as a frequency of the source language word appearing in source language tags of the relevant images. For example, the data entry in the column for French (target language) word "vieux" and the row for English (source language) word "old" can have a value 5 indicating there are five relevant images having "old" in their English tags and "vieux" in their French tags. Other ways of measuring the co-occurrence between the source language word and the target language word can be utilized. A detailed example of the co-occurrence matrix 118 will be presented with respect to FIG. 4.

At block 312, the process 300 involves determining if there are more target language words to be evaluated. If so, the process 300 involves retrieving the next word in the target language words at block 304 and repeating the above process to generate information for additional columns of the co-occurrence matrix 118. If it is determined at block 312 that there are no more target language words to be evaluated, the process 300 involves building the co-occurrence matrix 118 at block 314. The context-based translation application 104 utilizes the information generated for each column (i.e. each target language word) at block 310 to build the co-occurrence matrix 118. The rows of the co-occurrence matrix 118 correspond to the source language words identified from the relevant images of the target language words. The value for the matrix element in the i-th row of the j-th column indicates the co-occurrence between the i-th source language word and the j-th target language word. If the i-th source language word is not related to the j-th target language word, i.e. not identified from the relevant images of the j-th target language word, the value of the matrix element at the i-th row of the j-th column is set to zero. Because the rows of the co-occurrence matrix 118 contain the source language words identified from the relevant images of all the target language words represented by the co-occurrence matrix 118 and each target language word is typically related to a few source language words, the co-occurrence matrix 118 might be a sparse matrix containing many zeros. The context-based translation application 104 further outputs the generated co-occurrence matrix 118 at block 314.

FIG. 4 depicts an example of the co-occurrence matrix structure and an example of a co-occurrence matrix. The top figure of FIG. 4 is an example of the co-occurrence matrix structure. In this example, the co-occurrence matrix 118 includes multiple columns, one column for one target language word $W_{Tj}$. The rows of the co-occurrence matrix 118 represent different source language words with one row corresponding to one source language word $W_{Si}$. The matrix element at the i-th row and the j-th column shows the co-occurrence $C_{ij}$ of the source language word $W_{Si}$ and the target language word $W_{Tj}$. In the example shown in FIG. 4, the co-occurrence $C_1$ is measured as the number of images from relevant images of $W_{Tj}$ that include $W_{Si}$ as a word in their tags.

The bottom figure of FIG. 4 shows an example of the co-occurrence matrix 402 where English is the source language and French is the target language. In this co-occurrence matrix 402, the co-occurrence between the target language word "vieux" and the source language word "old" is 5, whereas the co-occurrence between the "vieux" and "ancient" is 2. This means that among the relevant images of the French word "vieux" (e.g. the images that contain "vieux" in their French tags), five relevant images have the English word "old" in their English tags and two have "ancient" in their English tags. As such, the pair of words "vieux" and "old" appeared together in more images than the pair of "vieux" and "ancient." Similarly, the pair of words "dinde" and "turkey" appeared together more frequently than the pair "turquie" and "turkey" in the images 114. As will be shown later, the co-occurrence matrix 118 can be utilized to determine the impact of the context of a source language tag to the translation of the source language tag.

Referring back to FIG. 2, at block 204, the process 200 involves obtaining an input image 122 and its associated input tags in a source language, also referred to as "source language tags" of the input image 122. The image tag translation system 102 further obtains an indication of the target language, into which the input tags are to be translated. At block 206, the process 200 involves generating multiple candidate translations for an input tag of the input image 122. In some examples, the input tag is a single-word tag. The context-based translation application 104 may generate the multiple candidate translations of the input tag using the dictionary service 110. For instance, the context-based translation application 104 can send the single-word source tag to the dictionary service 110. The dictionary service 110 looks up the dictionaries 120 for the target language and returns multiple possible translations for this single-word tag as the candidate translations.

At block 208, the process 200 involves determining a translated tag for the input tag from the multiple candidate translations. In some examples, the context-based translation application 104 determines the translated tag based on the co-occurrence matrix 118 determined at block 202. Denote t as the current input tag to be evaluated or translated. Denote T' as the set of the input tags of the input image 122 except for the tag t currently being translated. In some examples, T' includes all the input tags of the input image 122 except for t. In other examples, T' includes a subset of the input tags of the input image 122 except for t. The input tags t' contained in T' are also referred to as "context tags" of the input tag t and T' is also referred to as "context tag set" of the input tag t.

Assuming there are N candidate translations for the input tag t, the context-based translation application 104 calculates a context score for a candidate translation k as:

$$ContextScore_{tk} = \left( \sum_{t' \in T'} CO[t'][k] \times ConfScore_{t'} \right) \times IsPrinciple_{tk}, \quad (1)$$

where CO is the co-occurrence matrix 118 generated at block 202 for the source language and the target language. CO[t'] [k] represents the co-occurrence of the candidate translation k and the source language word contained in the context tag t' determined using the co-occurrence matrix. $ConfScore_{t'}$ is the confidence score of the context tag t'. Depending on the way the context tag t' is determined, the $ConfScore_{t'}$ can be generated by an automatic tag generator or assigned a fixed value if the input tag t' is manually labeled by a user. The automatic tag generator may be implemented through a machine learning model that is trained to determine the tag of an image by analyzing the image attributes, contents, and so on. The machine-learning model may also output a confidence score to show how confident the predicted tag is and this confidence score can be utilized as the $ConfScore_{t'}$ in Eqn. (1). If the context tag t' is manually labeled by a user, the $ConfScore_{t'}$ can be set to a fixed value, such as 1 or a value close to 1. $IsPrinciple_{tk}$ is a value indicating whether the candidate translation k is the principal translation for the word contained in the input tag t. In some examples, $IsPrinciple_{tk}$ is set to 5 if the candidate translation k is the principal translation and is set to 1 otherwise. If the context-based translation application 104 obtains the candidate translation from the dictionary service 110, the $IsPrinciple_{tk}$ can be provided by the dictionary service 110. In some embodiments, the $ContextScore_{tk}$ may be calculated without using ConfScore, IsPrinciple, or both. In other words, ConfScore, IsPrinciple or both can be set to 1 in Eqn. (1).

Through Eqn. (1), the context-based translation application 104 examines how the candidate translation k is related to the context tags of the input tag t. The context tags of the input image 122 describe the context of the current input tag t. The quantitative relation between the candidate translation k and a context tag t' is determined through the co-occurrence matrix 118. In the example of the co-occurrence matrix shown in FIG. 4, if a candidate translation k and a context tag t' appeared frequently in the relevant images, then they are highly related, otherwise, they are less related. If the contextScore for candidate translation k determined through Eqn. (1) is has a value higher than other candidate translations, it means that the candidate translation k is highly related to the context tags of the image and thus it is more likely to be the accurate translation than other candidate translations.

The parameter ConfScore, if used in the calculation of the contextScore, can be utilized to provide a higher weight to high-confidence context tags than context tags with low confidence. In other words, the co-occurrence between the candidate translation and a high-confidence context tag can be trusted more than the co-occurrence between the candidate translation and a low-confidence context tag. The parameter IsPrinciple, if used in the calculation of the contextScore, can be utilized to provide a higher weight to the candidate translation that is the primary translation of the input tag t.

The context-based translation application 104 compares the context scores of the candidate translations and determines the candidate translation having the highest context score as the translated tag for the input tag t.

At block 210, the process 200 involves associating the translated tag with the input image 122. In some examples, the context-based translation application 104 modifies the metadata of the input image 122 to include the translated tag and generate the output image 124. The context-based translation application 104 may also associate the translated tag with the input image 122 through other ways, such as using a lookup table. The context-based translation application 104 repeats the operations in blocks 204 to 210 for other input tags of the input image 122. The generated output image 124 having both the input tags 130 and the translated tags 132 can also be included in the images 114 for building or updating the co-occurrence matrix 118.

FIG. 5 depicts an example of an image 500 with input tags in English and translated tags in French, according to certain aspects of the present disclosure. The example shown in FIG. 5 has three columns. The left column 502 shows the input tags of the image 500; the middle column 504 shows the translated tags using a prior art solution, and the right column 506 shows the translated tags generated using the context-based image tag translation presented herein. FIG. 5 shows that the context-based image tag translation presented herein can provide a better and more accurate translation of image tags than the prior art. For example, the image 500 depicts the Blue Mosque in Istanbul, Turkey. As such, the input tags of image 500 include "istanbul," "mosque," "turkey" and so on. The prior art method translates the input tag "turkey" into the French word "dinde" which means the animal turkey. The context-based image tag translation, on the other hand, accurately translates it into the French word "turquie," i.e. the country Turkey.

Figure 6:
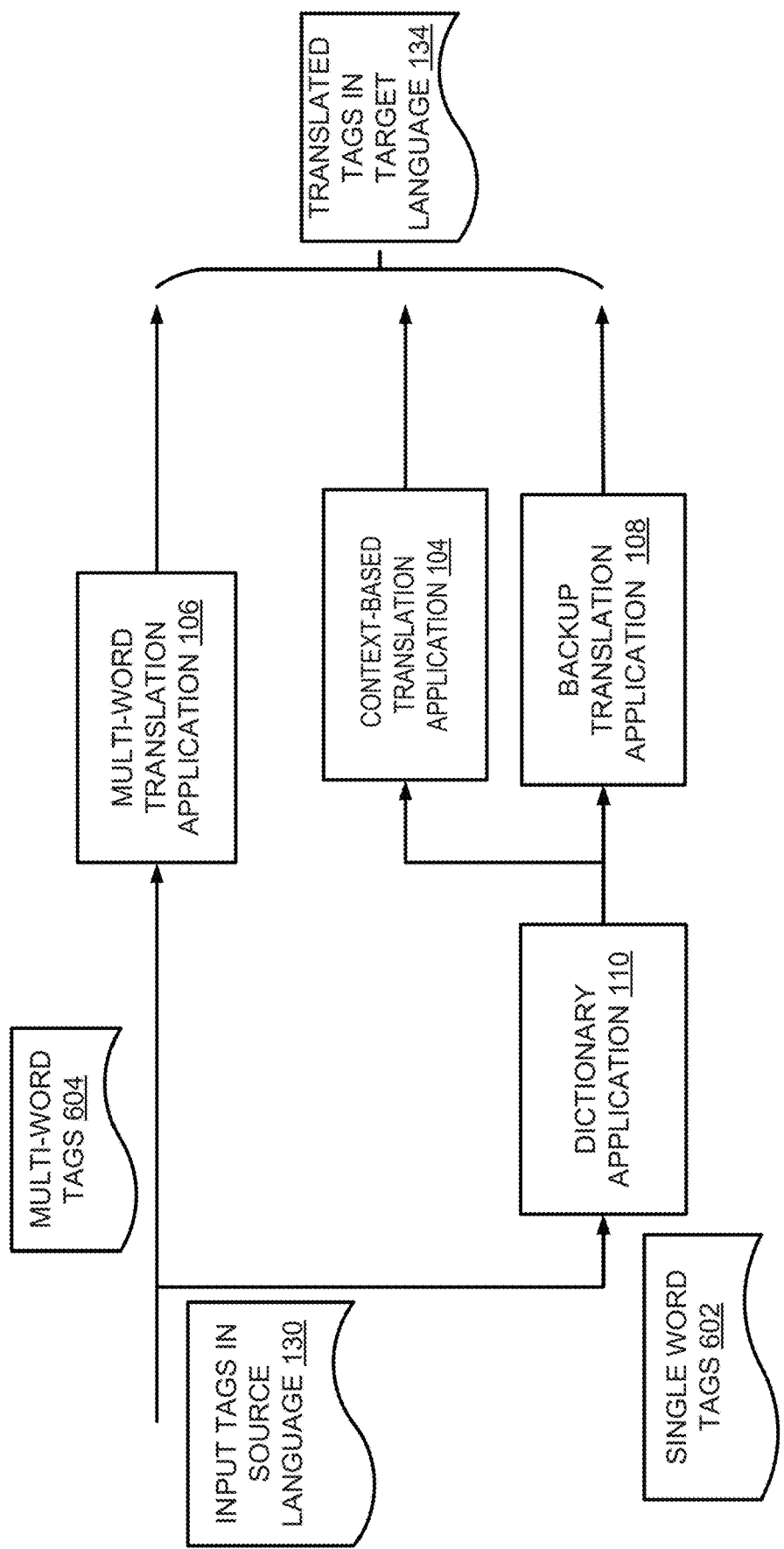
FIG. 6 depicts an example of a block diagram of the various software modules used for translating an input image tag from a source language into a target language, according to certain aspects of the present disclosure.

The context-based image tag translation can be applied to a single-word input tag that has multiple candidate translations. For other types of input tags, the image tag translation system 102 may utilize other applications or services for translation. FIG. 6 depicts an example of a block diagram of the various software modules used for translating an input image tag from a source language into a target language.

In the example shown in FIG. 6, the image tag translation system 102 employs different applications for multi-word tags 604 and single-word image tags 602. For a multi-word tag 604, the image tag translation system 102 utilizes a multi-word translation application 106 to generate the translated tag 132. In some implementations, the multi-word translation application 106 includes a machine-learning model that can translate a multi-word tag from the source language to the target language. The machine-learning model can include one or multiple LSTM models to perform the translation of multi-word image tags. The multi-word translation application 106 can also use existing models trained to perform translations of sentences from the source language to the target language. Alternatively, or additionally, the multi-word translation application 106 can train a machine-learning model for translating image tags rather than full sentences and utilizes the training model for multi-word tag translation. If the input tag 130 is to be translated into multiple target languages, multiple machine-learning models might be built, one for each language, and used to perform the translation.

For a single-word tag 602, the image tag translation system 102 can utilize the dictionary service 110 to obtain the candidate translation of the word in the tag 602. In some implementations, the dictionary service 110 can include multiple dictionaries 120, one for each target language, for translating a word in a source language into a target language. The dictionaries 120 may be built by including word entries from existing published dictionaries. In some implementations, the dictionaries 120 may be refined manually by experts to select a set of candidate translations for each word. Depending on the word contained in the single-word tag 602, the dictionary service 110 may return multiple candidate translations. In that case, the image tag translation system 102 employs the context-based translation application 104 as described above to select a suggested candidate translation as the translated tag 134 for the input tag 130.

Because the dictionaries 120 utilized by the dictionary service 110 have limited data entries. It is likely that the dictionary service 110 cannot find a candidate translation for the single-word tag 602. In this scenario, the image tag translation system 102 employs a backup translation application 108 to generate the translated tag 134. In some implementations, the backup translation application 108 is implemented as a comprehensive translation service but with lower accuracy than the dictionary service 110 and the context-based translation application 104. For example, the backup translation application 108 can be implemented using an existing model trained for translating words or sentences from a source language to a destination language. Alternatively, the backup translation application 108 can be implemented by aligning word embeddings that have been generated for different source language words and target language words. For example, to translate a word in English to French, the English embedding of the input English word can be used to find the most correlated words in French embeddings and produce those highly correlated French words as the translation of the word. Other ways of implementing the backup translation application 108, such as utilizing a cloud translation service through a network, can also be utilized.

Figure 7:
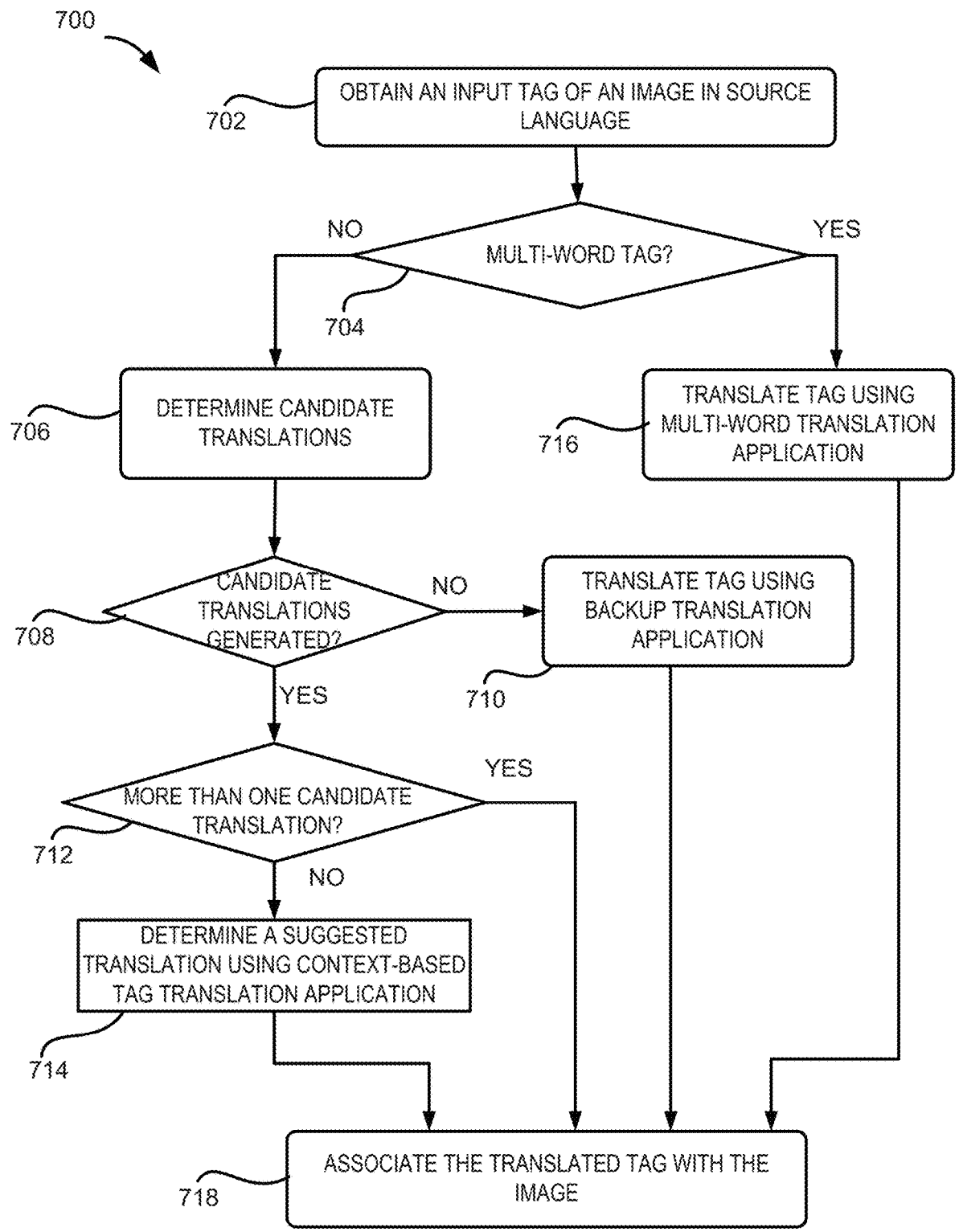
FIG. 7 depicts an example of a process for generating a translated tag in a target language for an input tag of an input image in the source language, according to certain aspects of the present disclosure.

FIG. 7 depicts an example of a process 700 for generating a translated tag for an input tag of an input image, according to certain aspects of the present disclosure. One or more computing devices (e.g., the image tag translation system 102) implement operations depicted in FIG. 7 by executing suitable program code (e.g., the context-based translation application 104, the multi-word translation application 106, and the backup translation application 108). For illustrative purposes, process 700 is described with reference to certain examples depicted in the figures. Other implementations, however, are possible.

At block 702, the process 700 involves obtaining an input tag 130 of an input image 122 that is to be translated from a source language into a target language. At block 704, the process 700 involves determining if the input tag 130 is a multi-word tag, i.e. the input tag 130 contains more than one source language words. If the image tag translation system 102 determines that the input tag 130 is a multi-word tag, the process 700 involves, at block 716, translating the multi-word tag into the translated tag 134 using the multi-word translation application 106 as described above with regard to FIGS. 1 and 6.

If the image tag translation system 102 determines that the input tag 130 is a single-word tag, the process 700 involves, at block 706, determining candidate translations of the single word contained in the input tag 130, such as by using the dictionary service 110 as described above with regard to FIGS. 1 and 6. At block 708, the process 700 involves determining if there are any candidate translation generated at block 706. If not, the process 700 involves, at block 710, translating the input tag 130 into a translated tag 134 using the backup translation application 108 as described above with regard to FIGS. 1 and 6.

If the image tag translation system 102 determines that there are candidate translations for the single word of the input tag 130, the process 700 involves, at block 712, determining if there is more than one candidate translation. If not, the image tag translation system 102 uses the one candidate translation determined at block 706 as the translated tag 134. If the image tag translation system 102 determines that there are more than one candidate translation, the process 700 involves determining a suggested translation for the input tag 130 using the context-based translation application 104 as described above with respect to FIGS. 2-5. At block 718, process 700 involves associating the translated tag 134 with the input image.

Although in the above description, the image tag translation system 102 utilizes the context-based translation application 104 for single-word image tags, context-based translation application 104 can also be employed to translate multi-word image tags. For example, the image tag translation system 102 may obtain multiple candidate translations for a multi-word image tag, such as using the multi-word translation application 106. In that case, the image tag translation system 102 can employ the context-based translation application 104 to determine a suggested candidate translation for the multi-word tag based on the context of the image, such as the co-occurrence matrix 118.

Figure 8:
FIG. 8 depicts another example of an image with tags in English and translated tags in French, according to certain aspects of the present disclosure.

FIG. 8 depicts an example of an image 800 with input tags in English and translated tags in French, according to certain aspects of the present disclosure. Similar to FIG. 5, the example shown in FIG. 8 also has three columns of image tags. The left column shows the input tags of the image 800; the middle column shows the translated tags using a prior art solution, and the right column shows the translated tags generated using the image tag translation presented herein. In the example shown in FIG. 8, the image tag translation presented herein can provide a more accurate translation of image tags than the prior art. For example, image 800 depicts a group of white people sitting in an area. The input tags of image 800 thus include multi-word tag "caucasian ethnicity," "group," "friends" and so on. As shown in FIG. 8, for the multi-word tag "caucasian ethnicity," the image tag translation presented here provide a more accurate translation than the prior art method. Similarly, for single-word tags such as "group," the image tag translation also provide a better and more accurate translation than the prior art method. As such, the image tag translation framework of the present disclosure is able to provide accurate translation for a variety of image tags.

Computing System Example for Implementing Context-Based Image Tag Translation

Figure 9:
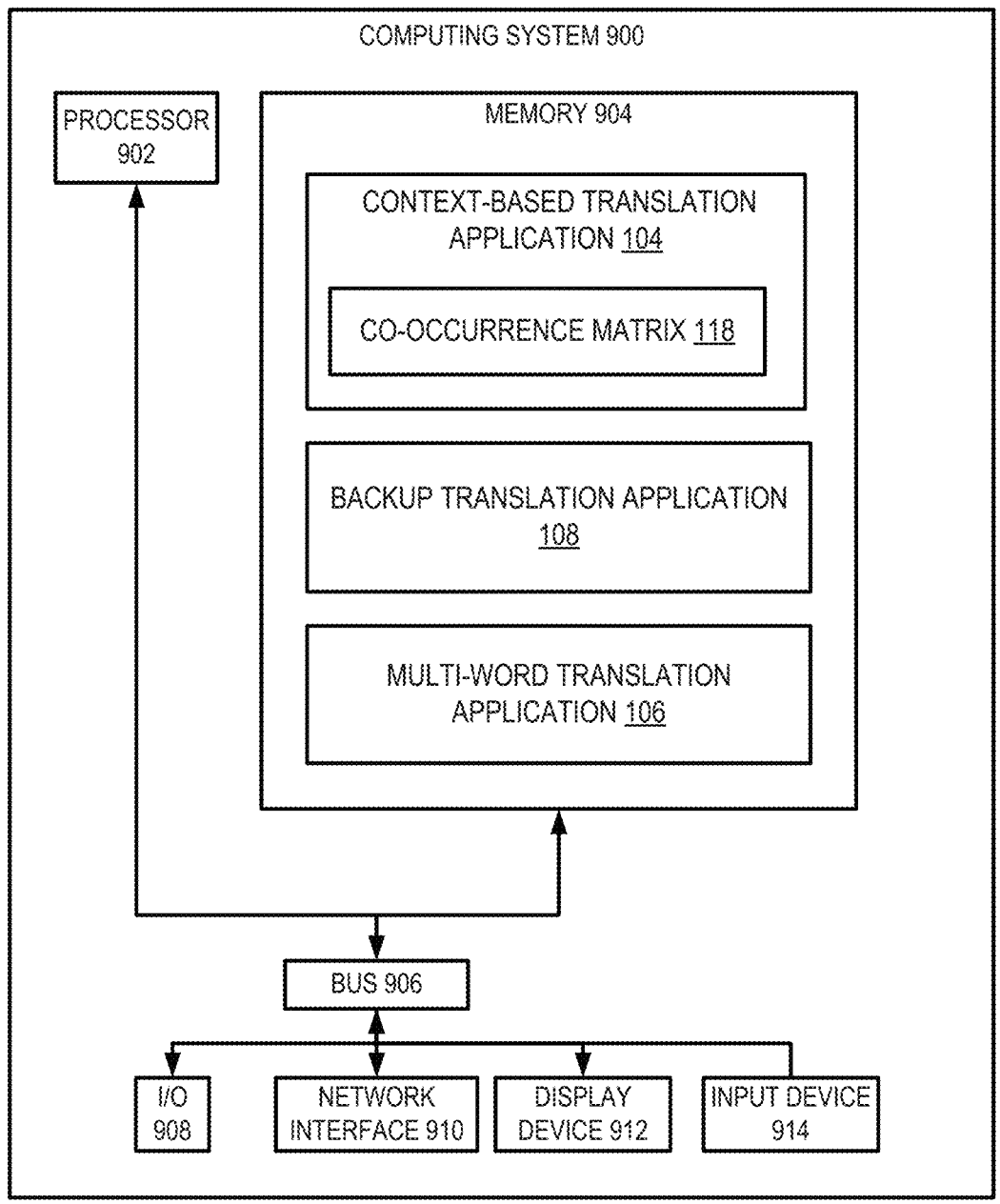
FIG. 9 depicts an example of a computing system that executes an image manipulation application for performing certain aspects of the present disclosure.

Any suitable computing system or group of computing systems can be used for performing the operations described herein. For example, FIG. 9 depicts an example of a computing system 900 that can implement the computing environment of FIG. 1. In some embodiments, the computing system 900 includes a processing device 902 that executes the context-based translation application 104, the multi-word translation application 106, the backup translation application 108 or a combination of both, a memory that stores various data computed or used by these applications or systems, an input device 914 (e.g., a mouse, a stylus, a touchpad, a touchscreen, etc.), and a display device 912 that displays graphical content generated by the image tag translation system 102. For illustrative purposes, FIG. 9 depicts a single computing system on which the context-based translation application 104, the multi-word translation application 106, or the backup translation application 108 is executed, and the input device 914 and display device 912 are present. But these applications, datasets, and devices can be stored or included across different computing systems having devices similar to the devices depicted in FIG. 9.

The depicted example of a computing system 900 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as an input device 914, a display device 912, or other input or output devices. For example, the computing system 900 is shown with one or more input/output ("I/O") interfaces 908. An I/O interface 908 can receive input from input devices or provide output to output devices. One or more buses 906 are also included in the computing system 900. The buses 906 communicatively couples one or more components of a respective one of the computing system 900.

The computing system 900 executes program code that configures the processing device 902 to perform one or more of the operations described herein. The program code includes, for example, the context-based translation application 104, the multi-word translation application 106, the backup translation application 108 or other suitable applications that perform one or more operations described herein. The program code may be resident in the memory device 904 or any suitable computer-readable medium and may be executed by the processing device 902 or any other suitable processor. In some embodiments, all applications in the image tag translation system 102 (e.g., the context-based translation application 104, the multi-word translation application 106, the backup translation application 108, etc.) are stored in the memory device 904, as depicted in FIG. 9. In additional or alternative embodiments, one or more of these modules from the image tag translation system 102 are stored in different memory devices of different computing systems.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a computing device that receives inputs for the image tag translation system 102 or displays outputs of the image tag translation system 102) via a data network using the network interface device 910.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. A display device 912 can include any device or group of devices suitable for providing visual, auditory, or other suitable sensory output. Non-limiting examples of the display device 912 include a touchscreen, a monitor, a separate mobile computing device, etc.

Although FIG. 9 depicts the input device 914 and the display device 912 as being local to the computing device that executes the image tag translation system 102, other implementations are possible. For instance, in some embodiments, one or more of the input device 914 and the display device 912 can include a remote client-computing device that communicates with the computing system 900 via the network interface device 910 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    obtaining a set of target language words expressed in a target language;
    retrieving, from an image database, relevant digital images that are related to the set of target language words, each of the relevant digital images having a first tag in the target language that is related to a target language word in the set of target language words and a second tag in a source language that is a translation of the first tag, wherein the first tag and the second tag are embedded in a metadata of the each of the relevant digital images and the metadata comprises at least the first tag and the second tag;
    generating a co-occurrence data structure for the target language based on the relevant digital images, wherein the co-occurrence data structure describes a co-occurrence of a target language word from the set of target language words and a source language word associated with the relevant digital images;
    receiving an input tag for a digital input image in a source language, wherein the digital input image has a plurality of tags in the source language including the input tag;
    generating a plurality of candidate translations in the target language for the input tag;
    determining a translated tag from the plurality of candidate translations based on the co-occurrence data structure indicating a higher relevance for the translated tag than a different translated tag from the plurality of candidate translations, wherein the determining comprises:
    for each candidate translation in the plurality of candidate translations, determining a context score based on co-occurrences of the candidate translation and source language words in the plurality of tags of the digital input image other than the input tag, and selecting a first candidate translation with a highest context score as the translated tag for the input tag;
    modifying a digital file representing the digital input image to add the translated tag to the digital file representing the digital input image; and
    servicing an image search query based on the translated tag.

2. The method of claim 1, wherein the co-occurrence of the target language word and the source language word is determined as a number of the relevant digital images related to the target language word and associated with the source language word.

3. The method of claim 1, wherein the co-occurrence of the target language word and the source language word is determined by:
    identify a set of the relevant digital images that are related to the target language word;
    determining source language tags of the set of the relevant digital images, the source language tags comprising the source language word; and
    determining the co-occurrence of the target language word and the source language word as a number of images in the set of the relevant digital images that have the source language tags containing the source language word.

4. The method of claim 1, wherein the context score of the candidate translation is further determined based on confidence scores associated with the plurality of tags of the digital input image other than the input tag.

5. The method of claim 1, wherein the context score of the candidate translation is further determined based on a confidence score associated with the candidate translation.

6. The method of claim 1, wherein the input tag comprises a single word and wherein the plurality of candidate translations are generated based on a dictionary.

7. The method of claim 1, further comprising determining that the input tag is a single-word tag, wherein generating the plurality of candidate translations in the target language for the input tag is performed in response to determining that the input tag is a single-word tag and based on a dictionary.

8. The method of claim 7, further comprising:
    determining no candidate translations in the target language are generated for the input tag based on the dictionary; and
    responsive to determining that no candidate translations are generated based on the dictionary, generating the translated tag in the target language for the input tag based on a backup translation application.

9. The method of claim 1, further comprising:
   determining that the input tag is a multi-word tag; and
   responsive to determining that the input tag is a multi-word tag, determining the translated tag for the input tag via a multi-word translation application.

10. The method of claim 9, wherein the multi-word translation application comprises a machine learning model trained to translate a multi-word tag from the source language to the target language.

11. A system comprising:
   a processing device; and
   a non-transitory computer-readable medium communicatively coupled to the processing device, wherein the processing device is configured to execute program code stored in the non-transitory computer-readable medium and thereby perform operations comprising:
   obtaining a set of target language words expressed in a target language;
   retrieving, from an image database, relevant digital images that are related to the set of target language words, each of the relevant digital images having a first tag in the target language that is related to a target language word in the set of target language words and a second tag in a source language that is a translation of the first tag, wherein the first tag and the second tag are embedded in a metadata of the each of the relevant digital images and the metadata comprises at least the first tag and the second tag,
   generating a co-occurrence data structure for a target language based on the relevant digital images, wherein the co-occurrence data structure describes a co-occurrence of a target language word in the set of target language words and a source language word in the relevant digital images;
   receiving an input tag for a digital input image in the source language, wherein the digital input image has a plurality of tags in the source language including the input tag;
   obtaining a plurality of candidate translations in the target language for the input tag;
   determining a translated tag from the plurality of candidate translations based on the co-occurrence data structure, wherein the determining comprises:
   for each candidate translation in the plurality of candidate translations, determining a context score based on co-occurrences of the candidate translation and words in the plurality of tags of the digital input image other than the input tag; and
   selecting a first candidate translation with a highest context score as the translated tag for the input tag;
   modifying a digital file representing the digital input image to add the translated tag to the digital file representing the digital input image; and
   servicing an image search query based on the translated tag.

12. The system of claim 11, wherein the co-occurrence of the target language word and the source language word is determined as a number of the relevant digital images related to the target language word and associated with the source language word.

13. The system of claim 11, wherein the co-occurrence of the target language word and the source language word is determined by:
   identifying a set of the relevant digital images that are related to the target language word;
   determining source language tags of the set of the relevant digital images, the source language tags comprising a source language word; and
   determining the co-occurrence of the target language word and the source language word as a number of images in the set of the relevant digital images that have the source language tags containing the source language word.

14. A non-transitory computer-readable medium having program code that is stored thereon, the program code executable by one or more processing devices for performing operations comprising:
   obtaining a set of target language words expressed in a target language;
   retrieving, from an image database, relevant digital images that are related to the set of target language words, each of the relevant digital images having a first tag in the target language that is related to a target language word in the set of target language words and a second tag in a source language that is a translation of the first tag, wherein the first tag and the second tag are embedded in a metadata of the each of the relevant digital images and the metadata comprises at least the first tag and the second tag;
   generating a co-occurrence data structure for the target language based on the relevant digital images; wherein the co-occurrence data structure describes a co-occurrence of a target language word from the set of target language words and a source language word associated with the relevant digital images,
   receiving an input tag for a digital input image in the source language, wherein the digital input image has a plurality of tags in the source language other than the input tag;
   generating a plurality of candidate translations in a target language for the input tag;
   determining a translated tag from the plurality of candidate translations based on the plurality of tags of the digital input image in the source language, wherein the determining comprises:
   for each candidate translation in the plurality of candidate translations, determining a context score based on co-occurrences of the candidate translation and words in the plurality of tags of the digital input image other than the input tag, and
   selecting a first candidate translation with a highest context score as the translated tag for the input tag; and
   modifying a digital file representing the digital input image to add the translated tag to the digital file representing the digital input image; and
   servicing an image search query based on the translated tag.

15. The non-transitory computer-readable medium of claim 14, wherein the co-occurrence of the target language word and the source language word is determined by:
   identifying a set of the relevant digital images that are related to the target language word;
   determining source language tags of the set of the relevant digital images, the source language tags comprising the source language word; and
   determining the co-occurrence of the target language word and the source language word as a number of images in the set of the relevant digital images that have the source language tags containing the source language word.

16. The non-transitory computer-readable medium of claim 14, wherein the context score of each candidate translation is further determined based on a confidence score associated with the candidate translation.

* * * * *